Patented June 12, 1951

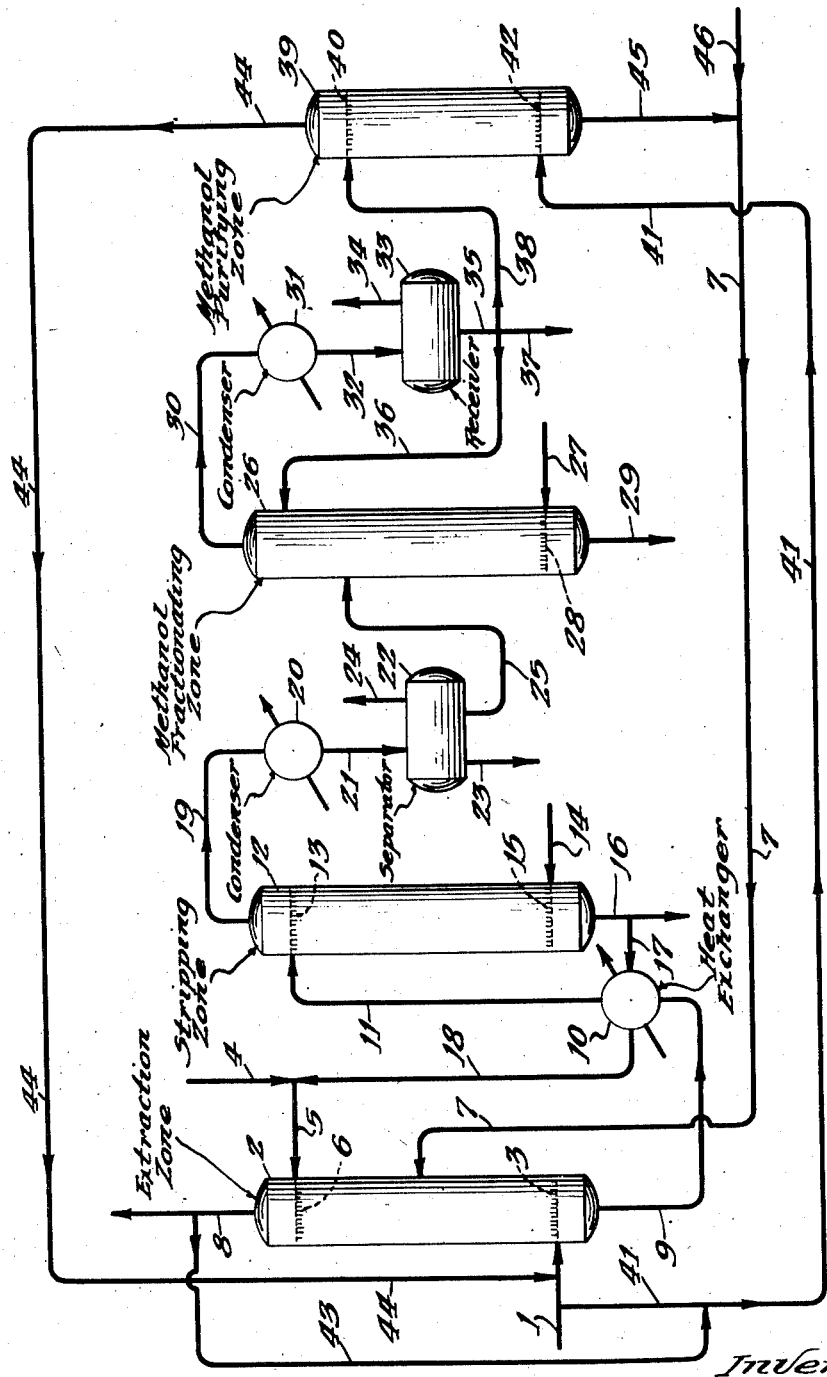

2,556,157

UNITED STATES PATENT OFFICE 2,556,157

DESULFURIZATION PROCESS

Kenneth M. Brown, Hindsdale, and Clarence G. Gerhold, Riverside, Ill., assignors to Universal Oil Products Company, Chicago, Ill., a corporation of Delaware Application January 29, 1949, Serial No. 73,524

6 Claims. (Cl. 196—32)

This invention relates to the desulfurization of hydrocarbons and more particularly to the removal of acidic organic compounds from hydrocarbon oil by means of an alkaline-solvent solution.

In one embodiment the present invention relates to a desulfurization process which comprises treating hydrocarbon oil containing mercaptans with an aqueous solution comprising an alkali and an organic solvent, separating aqueous solution from treated oil and distilling the same to vaporize mercaptans, organic solvent and part of the water from the alkali, condensing the vapors to form a mercaptan layer and an aqueous solvent layer containing a small amount of mercaptans, separating said aqueous solvent layer from the mercaptan layer, distilling said aqueous solvent layer to separate a solvent fraction containing mercaptans, contacting said solvent fraction with hydrocarbon liquid to reduce the mercaptan content thereof, and separating the solvent of reduced mercaptan content from said hydrocarbon liquid.

While any suitable alkaline reagent, including sodium hydroxide, potassium hydroxide, etc., and any suitable organic solvent which is more soluble in an aqueous solution of an alkaline reagent than in hydrocarbons, including methanol, ethanol, propanol, acetone, ethylene glycol, glycol ethers, etc., may be used, the preferred treating reagent comprises an aqueous solution of sodium hydroxide and methanol.

According to the present process, hydrocarbon fractions containing acidic organic compounds are treated with the alkaline-solvent solution at a temperature above the freezing point of the solution, which temperature is generally within the range of 80° to 110° F., although in some cases lower or higher temperatures may be used but the temperature usually will not be below 25° F. and not above 200° F. When treating gasoline, the pressure employed is usually within the range of 25 to 200 pounds, although lower or higher pressures may be used in some cases.

As heretofore set forth, the preferred treating reagent comprises an aqueous solution of sodium hydroxide and methanol. The quantity of sodium hydroxide may range from about 0.5% to 10% or more by volume based on the hydrocarbons to be treated, while the sodium hydroxide may be between about 35° and 50° Baumé and preferably between 45° and 50° Baumé. The methanol employed may be anhydrous or it may contain varying amounts of water. However, as the water content of the methanol fraction increases, the concentration of the sodium hydroxide solution should be increased accordingly.

In accordance with the invention, gasoline containing mercaptans and usually also containing phenols is contacted with the caustic-methanol solution under the conditions hereinbefore set forth. Sodium mercaptides and phenolates are formed and are dissolved in the caustic-methanol solution. This solution is then separated from the hydrocarbons, the caustic being regenerated, usually by stripping with steam, to convert the mercaptides into sodium hydroxide and mercaptans. The mercaptans, methanol and water are separated from the caustic, and the latter is returned to the first step of the process. The mercaptans are separated from the water-alcohol mixture, usually by settling under carefully controlled conditions which prevent turbulence. The methanol and water is then subjected to distillation to separate an overhead fraction comprising methanol from a bottoms fraction comprising water and whatever phenols may have been carried over at this step of the process. The methanol fraction will contain a small amount of water, of the order of 5%, and will also contain mercaptans which may range from about 1% to about 4% or more of this fraction. In accordance with the present invention, the methanol fraction is treated to remove a considerable portion of the mercaptans contained therein prior to recycling of the methanol for further use in the process. While any suitable method of removing the mercaptans may be employed, it is a particular feature of the present invention that a portion of the gasoline, either before or after treatment in the process, is utilized for this purpose. The mercaptans are more soluble in hydrocarbons than they are in an aqueous methanol solution, and this fact is taken advantage of by contacting the methanol solution with a portion of the gasoline to absorb the mercaptans therein and to thereby purify the methanol solution. A particular advantage to this method of treatment is that the gasoline containing the absorbed mercaptans will be returned to the first step of the process and the mercaptans are therein removed from the gasoline. By this method of methanol purification, the mercaptans are reintroduced with the gasoline to the lower portion of the extraction zone and thus will be subjected to extraction by the caustic-methanol solution. On the other hand, in the absence of this methanol purification, the mercaptans would be reintroduced with the methanol to an upper portion of the extraction zone and thus may be transferred to the treated gasoline leaving the extraction zone and thereby result in a treated gasoline of higher mercaptan content.

The invention is illustrated further in the accompanying diagrammatic flow drawing and in the following description of one specific operation of the process. In the interest of simplicity the following description will be limited to the treatment of gasoline by means of a caustic-methanol solution, although it is understood that other hydrocarbon fractions, either normally gaseous or normally liquid, may be treated in the process and that other suitable alkaline reagents and organic solvents may be employed but not necessarily with equivalent results. Further, in the interest of simplicity, valves, pumps, mixers and the like have been omitted from the drawing.

Referring to the drawing, gasoline or other charging stock is introduced to the process through line 1 and is directed into the lower portion of extraction zone 2, preferably by means of a suitable spray arrangement as illustrated at 3. Extraction zone 2 may comprise one or a plurality of suitable zones, preferably containing suitable packing material and/or contacting means such as bubble trays, bubble decks, side to side pans, etc. The packing material should not be detrimentally affected by the caustic-methanol and hydrocarbons at the operating conditions prevailing in this zone. A particularly suitable packing material comprises carbon Raschig rings. Sodium hydroxide is introduced to the process through line 4 and is directed through line 5 to the upper portion of zone 2, preferably through a suitable spray arrangement as indicated at 6. Usually sufficient sodium hydroxide is recycled within the process, in the manner to be hereinafter set forth in detail, and the sodium hydroxide introduced through line 4 from an extraneous source will comprise the makeup reagent to replace that lost or withdrawn from the process. Methanol recycled from within the process is directed through line 7 into an intermediate portion of zone 2, preferably through suitable distributing means not illustrated. Similarly, the methanol will comprise that recycled within the process and any makeup methanol introduced from an extraneous source to replace that lost or withdrawn from the process.

In zone 2 the gasoline flows upwardly in intimate contact with the caustic-methanol solution, and the acidic organic compounds, such as mercaptans and phenols contained in the gasoline, are converted into sodium mercaptides and phenolates and are dissolved in the caustic-methanol solution. The rates of flow of the gasoline, caustic and methanol are so adjusted that the treated gasoline being withdrawn from the upper portion of zone 2 through line 8 contains substantially less mercaptans than the gasoline introduced through line 1 and, in accordance with the present invention, the treated gasoline removed through line 8 will be substantially doctor sweet. The treated gasoline, if desired, may be passed through a filter containing sand, pebbles or clay to remove traces of alkaline reagent, or the gasoline may be subjected to water washing.

Spent treating solution, comprising an aqueous alcoholic solution containing unreacted sodium hydroxide, sodium mercaptides, sodium phenolates and methanol, is withdrawn from the lower portion of zone 2 through line 9 and is directed through heat exchanger 10 and line 11 to stripping zone 12, preferably through a suitable spray arrangement as illustrated at 13. Zone 12 preferably contains a suitable packing material which may conveniently comprise carbon Raschig rings and may also contain contacting means such as bubble trays, bubble decks, side to side pans, etc. In zone 12, the treating solution is subjected to regeneration by heating which, in the case herein illustrated, comprises stripping with steam introduced through line 14 and preferably directed through a suitable spray arrangement indicated at 15. The temperature maintained in the lower portion of the stripping zone is substantially the boiling point of the treating solution which, with a 48° Baumé sodium hydroxide solution, will be of the order of 285° F. The temprature at the top of the stripping zone may be of the order of 200° to 250° F., depending in part on the temperature of the spent treating solution introduced thereto through line 11.

As a result of the heating, the sodium mercaptides are decomposed to mercaptans, with the liberation of an equivalent amount of sodium hydroxide. The sodium hydroxide is withdrawn from the lower portion of zone 12 through line 16 and may be removed from the process, but preferably all or a portion of the sodium hydroxide is directed through line 17, heat exchanger 10 and line 18 for recycling by way of line 5 to extraction zone 2 for further use therein. The mercaptans, methanol and water are vaporized in zone 12 and are directed therefrom through line 19, into and through condenser 20 and line 21 to separator 22. The condensate is permitted to settle and stratify in separator 22, whereby a mercaptan fraction is separated from a methanol-water fraction. Traces of gasoline which may have been carried over will be admixed with the mercaptan fraction, and this fraction is removed from separator 22 through line 23. Separator 22 is also provided with a conventional vent line 24.

The methanol-water fraction is withdrawn from separator 22 by means of line 25 and is directed into fractionating zone 26. In zone 26 the methanol-water fraction is subjected to heating and distillation by any suitable means, such as steam introduced through line 27, preferably by way of a suitable spray device indicated at 28. In fractionator 26 the methanol is separated from the water, and the latter is removed through line 29 to disposal as desired. It is understood that the water so recovered may be reused within the process if desired. Whatever phenols are vaporized and distilled overhead from stripping zone 12 will be removed through line 29 with the water. Methanol, along with a small amount of water and mercaptans as hereinbefore set forth, is removed from the upper portion of zone 26 through line 30 and is directed into and through condenser 31 and line 32 to receiver 33 having conventional vent line 34. The methanol fraction is withdrawn from receiver 33 through line 35 and a portion thereof is recycled by way of line 36 to the upper portion of fractionator 26 to serve as a cooling and refluxing medium therein. While the remaining portion of the methanol fraction may be removed from the process through line 37, in accordance with the present invention at least a portion thereof is directed through line 38 for treatment to reduce its mercaptan content.

In accordance with the invention, the methanol fraction is directed through line 38 to methanol purifying zone 39, preferably through a suitable spray arrangement as illustrated at 40. Zone 39 may comprise any suitable contacting zone, preferably containing suitable packing material which advantageously comprises carbon Raschig rings, and the methanol fraction passes downwardly therein countercurrently to an upwardly flowing stream of gasoline. While the case here illustrated comprises a countercurrent flow operation, it is understood that concurrent flow may be used. The gasoline may suitably comprise a portion of the untreated gasoline charging stock which may be diverted from line 1 through line 41 and directed into the lower portion of zone 39, preferably through a suitable spray arrangement as illustrated at 42. In another embodiment of the invention the treated gasoline being withdrawn from zone 2 may be utilized for this purpose and this may be accomplished by passing a portion of the treated gasoline from line 8 through lines 43 and 41 into zone 39.

It is a feature of the present invention that the methanol fraction is subjected to purification in a separate zone out of the presence of the total mercaptans separated in the process. By this method of treatment, the small quantity of mercaptans in the methanol fraction is substantially transferred from the methanol phase to the gasoline phase and the mercaptan content of the aqueous methanol fraction is thereby considerably reduced. On the other hand, if the purification of the methanol fraction were attempted in the presence of the total mercaptans separated in the process, as for example, by so treating the composition prevailing in separator 22, the percentage of mercaptans removed from the methanol fraction would be considerably less due to equilibrium considerations unless an excessively large quantity of gasoline, which theoretically would be an infinite amount, were used. If such a large quantity of gasoline were used, it would be contaminated with mercaptans and would have to be discarded from the process, at the same time discarding whatever methanol was dissolved in the gasoline.

The gasoline containing absorbed mercaptans is removed from zone 39 through line 44 and is supplied through line 1 to zone 2 for treatment therein in the manner hereinbefore set forth. The purified methanol fraction is withdrawn from zone 39 through line 45 and is directed through line 7 into zone 2 for further use therein in the manner hereinbefore set forth. Any required makeup methanol, to replace methanol lost or removed from the system, may be introduced to the process through line 46 or in any other suitable manner. There is a net withdrawal of mercaptan from separator 22 and only that small portion of mercaptan dissolved in the aqueous methanol phase is removed and returned to extraction zone 2.

The following example is introduced for the purpose of illustrating further the novelty and utility of the present invention but not with the intention of unduly limiting the same.

A cracked gasoline containing 0.08% mercaptan sulfur is introduced at a flow rate of 5000 barrels per day into the lower portion of the extraction zone, to which 250 barrels per day of an aqueous solution of sodium hydroxide of 48° Baumé and 75 barrels per day of methanol containing about 5% water and 0.0274% by weight of mercaptans are introduced. The extraction zone is maintained at a temperature of about 100° F. and a pressure of 75 pounds per square inch. The spent treating solution is removed from the lower portion of the extraction zone, is heated to a temperature of about 210° F. by indirect heat exchange, and is regenerated in the stripping zone by contact with steam superheated to a temperature of about 750° F. The bottom temperature of the stripping zone is about 285° F. and the top temperature is about 230° F. The regenerated caustic solution is recycled to the extraction zone, while the vaporized mercaptans, methanol and water are removed from the upper portion of the stripping zone, are cooled to a temperature of about 100° F., and are allowed to settle and stratify in the separating zone. The mercaptan stratum in the separating zone is withdrawn from the system, while the methanol-water fraction containing some dissolved mercaptan is supplied to the methanol fractionating column for separation of water from a methanol fraction which will contain about 1.3% by weight of mercaptan sulfur and about 5% by weight of water. The methanol fraction will comprise about 78 barrels per day and is contacted in a countercurrent flow with about 75 barrels per day of the untreated gasoline charging stock. By this method, about 98% of the mercaptans contained in the methanol fraction will be absorbed in the gasoline fraction, and the gasoline fraction containing the absorbed mercaptans is returned to the extraction zone for treatment therein. The mercaptan content of the methanol fraction will now be reduced from 1.3% by weight to 0.0274% by weight, and this purified methanol fraction, comprising about 75 barrels per day, is supplied to the extraction zone for utilization therein in the manner hereinbefore set forth.

The treated gasoline will contain 0.0004% or less of mercaptans and will be substantially doctor sweet. In an operation not employing the features of the present invention, the treated gasoline may contain about 0.001% mercaptan sulfur and will not be substantially doctor sweet.

We claim as our invention:

1. A desulfurization process which comprises treating hydrocarbon oil containing mercaptans with an aqueous solution of an alkali and an organic solvent, separating aqueous solution from treated oil, distilling said solution to vaporize mercaptans and organic solvent from the alkali, condensing the vapors to form a mercaptan fraction and an aqueous solvent fraction containing a small amount of mercaptans, separating said aqueous solvent fraction from a mercaptan fraction, distilling said aqueous solvent fraction to separate a solvent fraction containing a small amount of water and mercaptans, contacting the last-mentioned solvent fraction with hydrocarbon liquid to reduce the mercaptan content of the solvent fraction, and separating the solvent of reduced mercaptan content from said hydrocarbon liquid.

2. A desulfurization process which comprises treating gasoline containing mercaptans with an aqueous caustic-methanol solution, separating aqueous solution from treated gasoline, distilling said solution to vaporize mercaptans and methanol from the caustic, condensing the vapors to form a mercaptan fraction and an aqueous methanol fraction containing a small amount of mercaptans, separating said aqueous methanol fraction from a mercaptan fraction, distilling said aqueous methanol fraction to separate a methanol fraction containing a small amount of water and mercaptans, contacting the last-mentioned methanol fraction with hydrocarbon liquid to reduce the mercaptan content of the methanol fraction, and separating methanol of reduced mercaptan content from said hydrocarbon liquid.

3. The method as defined in claim 2 further characterized in that said hydrocarbon liquid comprises gasoline.

4. The method defined in claim 2 further characterized in that said hydrocarbon liquid comprises a portion of said treated gasoline.

5. The method as defined in claim 2 further characterized in that said hydrocarbon liquid comprises a portion of said gasoline containing mercaptans prior to treatment with aqueous caustic methanol.

6. A desulfurization process which comprises contacting gasoline containing mercaptans with an aqueous caustic-methanol solution in a treating zone, separating and separately withdrawing treated gasoline and aqueous solution from said treating zone, distilling said solution to vaporize mercaptans and methanol from caustic, condensing the vapors to form a mercaptan fraction and an aqueous methanol fraction containing a small amount of mercaptans, separating and separately withdrawing said mercaptan fraction and said aqueous methanol fraction, distilling said aqueous methanol fraction to separate a methanol fraction containing a small amount of water and mercaptans, contacting the last-mentioned methanol fraction with gasoline to reduce the mercaptan content of the methanol fraction, separating and separately withdrawing methanol of reduced mercaptan content and gasoline of increased mercaptan content, supplying said gasoline to a lower portion of said treating zone, and supplying said methanol to an intermediate portion of said treating zone.

KENNETH M. BROWN.
CLARENCE G. GERHOLD.

REFERENCES CITED

The following references are of record in the file of this patent:

UNITED STATES PATENTS

| Number | Name | Date |
|---|---|---|
| 2,431,770 | Payne et al. | Dec. 2, 1947 |
| 2,437,348 | Brown et al. | Mar. 9, 1948 |
| 2,474,028 | Berger | June 21, 1949 |